US012795352B2

(12) United States Patent
Kunz et al.

(10) Patent No.: US 12,795,352 B2
(45) Date of Patent: Nov. 10, 2026

(54) DYNAMIC USER EQUIPMENT IDENTIFIER ASSIGNMENT

(71) Applicant: Lenovo (Singapore) Pte. Ltd., New Tech Park (SG)

(72) Inventors: Andreas Kunz, Ladenburg (DE); Dimitrios Karampatsis, Ruislip (GB); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 494 days.

(21) Appl. No.: 18/018,979

(22) PCT Filed: Jul. 30, 2021

(86) PCT No.: PCT/IB2021/056998
§ 371 (c)(1),
(2) Date: Jan. 31, 2023

(87) PCT Pub. No.: WO2022/024080
PCT Pub. Date: Feb. 3, 2022

(65) Prior Publication Data

US 2023/0319545 A1 Oct. 5, 2023

Related U.S. Application Data

(60) Provisional application No. 63/059,839, filed on Jul. 31, 2020.

(51) Int. Cl.
*H04W 8/26* (2009.01)
*H04W 84/06* (2009.01)

(52) U.S. Cl.
CPC ............. *H04W 8/26* (2013.01); *H04W 84/06* (2013.01)

(58) Field of Classification Search
CPC ....... H04W 8/26; H04W 84/06; H04W 88/02; H04W 88/18; H04W 12/108; H04W 12/02
See application file for complete search history.

(56) References Cited

U.S. PATENT DOCUMENTS 11,936,525 B2 * 3/2024 Kunz ...................... H04W 4/40
2017/0134941 A1 * 5/2017 Naslund ............... H04L 63/061
(Continued)

FOREIGN PATENT DOCUMENTS

JP 2009094840 A 4/2009
JP 2009094940 A 4/2009
(Continued)

OTHER PUBLICATIONS

PCT/IB2021/056998, "Notification of Transmittal of the International Search Report and the Written Opinion of the International Searching Authority, or the Declaration", International Searching Authority, Oct. 8, 2021, pp. 1-12.
(Continued)

*Primary Examiner* — Kathy W Wang-Hurst
*Assistant Examiner* — Garth D Richmond
(74) *Attorney, Agent, or Firm* — Kunzler Needham Hilton

(57) ABSTRACT

Apparatuses, methods, and systems are disclosed for dynamic user equipment identifier assignment. One apparatus includes a transceiver that receives, at a user equipment ("UE") device, an initial identifier for the UE device from a mobile wireless communication network and a processor that generates a plurality of identifiers for the UE device based on the initial identifier where each of the plurality of identifiers is generated based on a previous identifier to form a chain of identifiers, assigns an identifier that was generated last in the chain of identifiers to the UE device, and periodically assigns a different identifier to the UE device
(Continued)

from the chain of identifiers, the different identifier comprising an identifier in the chain of identifiers that is used to generate the identifier that is currently assigned to the UE.

20 Claims, 9 Drawing Sheets

(56) References Cited

U.S. PATENT DOCUMENTS

| | | | | |
|---|---|---|---|---|
| 2018/0324580 | A1* | 11/2018 | Phuyal | H04B 7/15507 |
| 2022/0225448 | A1* | 7/2022 | Li | H04B 7/15 |
| 2023/0080113 | A1* | 3/2023 | Hong | H04W 68/02<br>370/329 |
| 2023/0101731 | A1* | 3/2023 | Sui | H04W 68/02<br>455/458 |

FOREIGN PATENT DOCUMENTS

| | | | |
|---|---|---|---|
| WO | 2008074366 | A1 | 6/2008 |
| WO | 2018236819 | A1 | 12/2018 |

OTHER PUBLICATIONS

3GPP, "3rd Generation Partnership Project; Technical Specification Group Services and System Aspects; Study on supporting Unmanned Aerial Systems (UAS) connectivity, Identification and tracking (Release 17)", 3GPP TR 23.754 V0.1.0, Jan. 2020, pp. 1-18.

* cited by examiner

DYNAMIC USER EQUIPMENT IDENTIFIER ASSIGNMENT

CROSS-REFERENCE TO RELATED APPLICATIONS

This application claims priority to U.S. Provisional Patent Application No. 63/059,829 entitled "METHOD OF ENABLING PRIVACY FOR UAV BROADCAST IDENTITIES" and filed on Jul. 31, 2021, for Andreas Kunz, et al., which is incorporated herein by reference.

FIELD

The subject matter disclosed herein relates generally to wireless communications and more particularly relates to dynamic user equipment identifier assignment.

BACKGROUND

In certain wireless communication systems, a User Equipment device ("UE") is able to connect with a fifth-generation ("5G") core network (i.e., "5GC") in a Public Land Mobile Network ("PLMN") In wireless networks, unmanned aerial vehicles ("UAVs") communicate with each other and send broadcast information over the UAV to UAV ("U2U") radio interface. If the sender identity does not change, it is easy to track a specific UAV by listening to the broadcast messages using the sender identity.

BRIEF SUMMARY

Disclosed are procedures for dynamic user equipment identifier assignment. Said procedures may be implemented by apparatus, systems, methods, and/or computer program products.

One apparatus includes a transceiver that receives, at a user equipment ("UE") device, an initial identifier for the UE device from a mobile wireless communication network and a processor that generates a plurality of identifiers for the UE device based on the initial identifier where each of the plurality of identifiers is generated based on a previous identifier to form a chain of identifiers, assigns an identifier that was generated last in the chain of identifiers to the UE device, and periodically assigns a different identifier to the UE device from the chain of identifiers, the different identifier comprising an identifier in the chain of identifiers that is used to generate the identifier that is currently assigned to the UE Another apparatus includes a transceiver that sends, to a user equipment ("UE") device from a mobile wireless communication network, an initial identifier for the UE device and a processor that generates a plurality of identifiers for the UE device based on the initial identifier where each of the plurality of identifiers is generated based on a previous identifier to form a chain of identifiers, associates an identifier that was generated last in the chain of identifiers with the UE device, and periodically associates a different identifier with the UE device from the chain of identifiers, the different identifier comprising an identifier in the chain of identifiers that is used to generate the identifier that is currently associated with the UE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
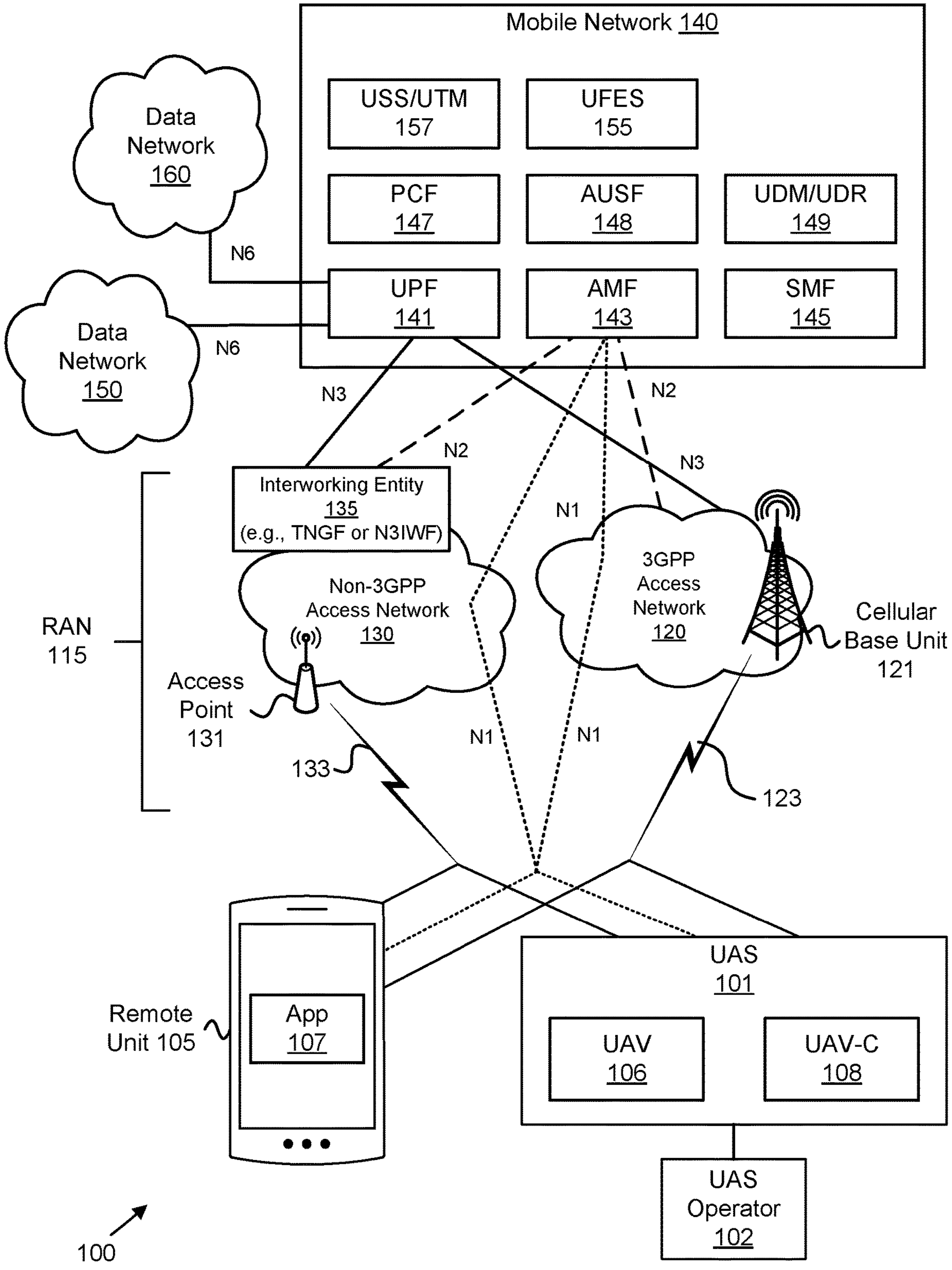
FIG. 1 is a schematic block diagram illustrating one embodiment of a wireless communication system for dynamic user equipment identifier assignment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for dynamic user equipment identifier assignment. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In conventional unmanned aerial vehicles ("UAV") systems, UAVs communicate with each other and send broadcast information over the UAV to UAV ("U2U") radio interface. If the sender identity does not change, it is easy to track a specific UAV by listening to the broadcast messages using the sender identity. In certain embodiments, if the sender simply randomizes the identifier, e.g., like in vehicle-to-everything ("V2X") broadcast communication, then an unmanned aerial system ("UAS") service supplier ("USS") and UAS traffic management ("UTM") would not know at a certain point in time the real identity of a potentially misbehaving UAV.

The proposed solutions described herein generate a hash chain, which looks like pseudo-random numbers when used in the opposite or reverse direction of the hash chain generation. Since both parties, e.g., the UAV and the wireless network function or node, go through the hash chain with the same update interval, the USS, UTM, UAV flight enablement subsystem ("UFES"), and/or the like, knows at any time the identity that the UAV is currently using or assigned.

FIG. 1 depicts a wireless communication system 100 for dynamic user equipment identifier assignment, according to embodiments of the disclosure. In one embodiment, the wireless communication system 100 includes at least one remote unit 105, a Fifth-Generation Radio Access Network ("5G-RAN") 115, a mobile core network 140, and a UAS 101. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In one embodiment, the UAS 101 comprises a components, networks, hardware, software, and/or the like for conducting unmanned aircraft operations between a UAV 106, e.g., a drone, and a UAV controller 108. The UAV 106 may refer to an aircraft without a human pilot, crew, or passengers that is remotely controlled using a UAV controller 108. A UAV controller 108 may refer to device that is configured to wirelessly send instructions to the UAV 106 for controlling the UAV, e.g., for controlling the speed, direction, orientation, and/or the like of the UAV, e.g., via the mobile network 140, an access network 120, 130, and/or the like. The UAS operator 102 may be the person who operates the UAV 106 (e.g., via the UAV controller 108) and who, typically, requests flight authorizations. The UAV 106 and UAV controller 108 may each be UEs in the wireless communication system 100 and/or may include an instance of a remote unit 105. As such, the UAV 106 and/or the UAV controller 108 may communicate with an access network 120 to access services provided by a mobile core network 140.

In some embodiments, the UAV 106 and/or the UAV-C controller 108 communicates with a UFES 155 and/or a USS/UTM 157 function via a network connection with the mobile core network 140. The USS/UTM 157, in one embodiment, provides a set of overlapping USSs that assist UAV 106 operators 102 in conducting safe and compliant operations. The services may include deconfliction of flight plans, remote identification, and/or the like.

As described below, the UAV 106 and/or UAV controller 108 may establish a PDU session (or similar data connection) with the mobile core network 140 using the RAN 115. The mobile core network 140 may then relay traffic between the UAV 106 and the UAV controller 108 and the packet data network 150 using the PDU session.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM")/Unified Data Repository function ("UDR") 149, a USS/UTM 157, and a UFES 155.

The UPF(s) 141 is responsible for packet routing and forwarding, packet inspection, QoS handling, and external PDU session for interconnecting Data Network ("DN"), in the 5G architecture. The AMF 143 is responsible for termination of non-access stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the is mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As described above, UAVs 106 communicate with one another, with a UAV controller 108, and/or the like, using broadcast messages. An issue is that if the UAV identifier is determined, unauthorized and/or other parties can track the UAV 106 and receive the broadcast messages. In one conventional solution to this problem, the UAV broadcast identifier is randomized to avoid tracking in a similar manner as in V2X. However, the problem with this solution is that, on the one hand, the tracking issue is resolved, but the USS/UTM 157 cannot relate the messages to a specific UAV anymore because it does not know the new randomly-generated identifier.

In another conventional solution, the USS/UTM 157 periodically assigns broadcast identities via application layer signaling, so that the USS/UTM 157 is aware of the broadcast identities that are in use. However, this solution has the drawback that signaling is heavily increased since all active UAVs 106 need to be periodically updated within a potentially short time interval.

To solve the problem of dynamically changing a UAVs 106 identity for broadcast and other communications, described above, the present disclosure proposes solutions where the UAV 106 and the USS/UTM 157 and/or the UFES 155 generate a hash chain, which looks like pseudo-random numbers when used in the opposite direction. Because the UAV 106 and the USS/UTM 157 and/or the UFES 155 use the same hash chain with the same update interval, the USS/UTM 157 and/or the UFES 155 knows at any time the identity that the UAV 106 is currently using or assigned.

In such an embodiment, the proposed solutions, described in more detail below, send an initial UAV identifier, update interval, and max hash-chain length from the USS/UTM 157 to the UAV 106, generate the same pseudo-random number list of identities in the UAV 106 and in the USS/UTM 157, which are used by the UAV 106 as source identity for its communication, update the UAV identifier according to the identities generated in the hash-chain at each update interval until the Initial UAV identifier is reached, and send the initial UAV identifier, update interval, and max hash chain with remote identification and tracking information ("RITI") information.

Beneficially, in one embodiment, the identifier assigned to the UAV 106 can be dynamically changed in such a way that the USS/UTM 157 and/or the UFES 155 knows the identifier that the UAV 106 is currently using or is currently assigned, and which may prevent others from tracking specific UAVs based on the UAVs identity.

In one embodiment, application layer identifier provisioning is provided. In such an embodiment, a hash-chain 200 is created to generate and store temporary UAV 106 identities that are used in the opposite/reverse order of generation, as shown in the FIG. 2.

In one embodiment, the hash-chain 200 is generated based on an initial identity 202. The initial identity 202 is input to a hash function, e.g., SHA256, SHA512, MDS, MD6, and/or the like, and the output of the hash function is the next identity (ID #1) 204*a* in the chain 200, which is then input again to the hash function, or different hash function that has been previously agreed to between the UAV 106 and the USS/UTM 157, to generate the next identity (ID #2) 204*b*, and so, until the maximum number of identities is generated. Even though a hash function is described to generate the chain of identifiers, one of skill in the art will recognize other methods for creating a chain of identifiers at the UAV 106 and at the USS/UTM 157 and/or the UFES 155.

The identities 204 may be stored (at the UAV 106 and at a location in the mobile network 140 that is accessible to the USS/UTM 157), and then used in the reverse order of generation. It may be easy and fast to generate a hash of an identity, but it may be difficult to reverse the operation. In one embodiment, the result is a pseudo-random chain of identifiers that may be assigned to the UAV 106, dynamically and over-time, in the reverse order of generation.

In one embodiment, the length of the identities is sufficiently long to avoid conflicts between multiple UAVs 106 using the same identity at the same time. In certain embodiments, various types of identifiers may be used, e.g., a temporary UAV identifier, a CAA-Level UAV identifier, a remote identifier, a broadcast remote identifier, an external identifier, and/or the like.

Figure 3:
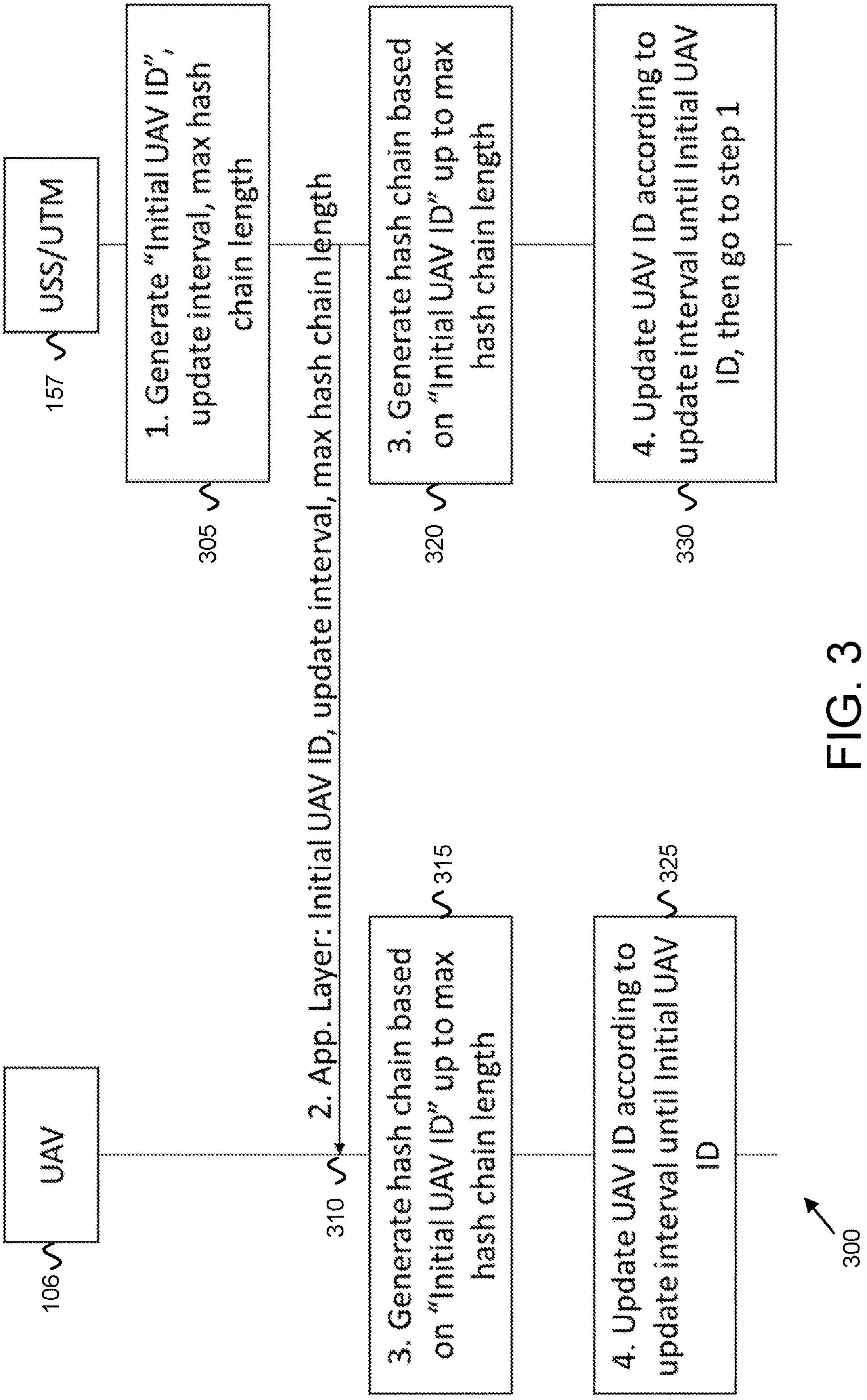
FIG. 3 is a signal flow diagram illustrating one embodiment of a procedure for generation and usage of hash chain identifiers for dynamic user equipment identifier assignment.

FIG. 3 depicts one embodiment of a procedure that describes the usage of the identities in the hash-chain. In the depicted embodiment, it is assumed that the UAV 106 is already registered to the mobile network and the USS/UTM 157, e.g., there is an application layer connection already established between the UAV 106 and USS/UTM 157.

In one embodiment, the USS/UTM 157 generates (see block 305) an initial UAV identifier as a start value for the hash-chain, as well as the update interval and the maximum hash-chain length. The update interval, as described above, defines the length of time that an identifier is assigned to a UAV 106 until a new identifier from the chain of identifiers is assigned to the UAV 106. In certain embodiments, the update interval multiplied by the hash-chain length indirectly indicates the interval that the USS/UTM 157 updates the UAV 106 with a new initial UAV identifier.

In further embodiments, the USS/UTM 157 provides (see messaging 310) at least one of the following information elements to the UAV 106: the initial UAV identifier, the update interval, and/or the maximum hash-chain length. The UAV 106, in certain embodiments, acknowledges the receipt of the parameters in a response to the USS/UTM 157.

Figure 2:
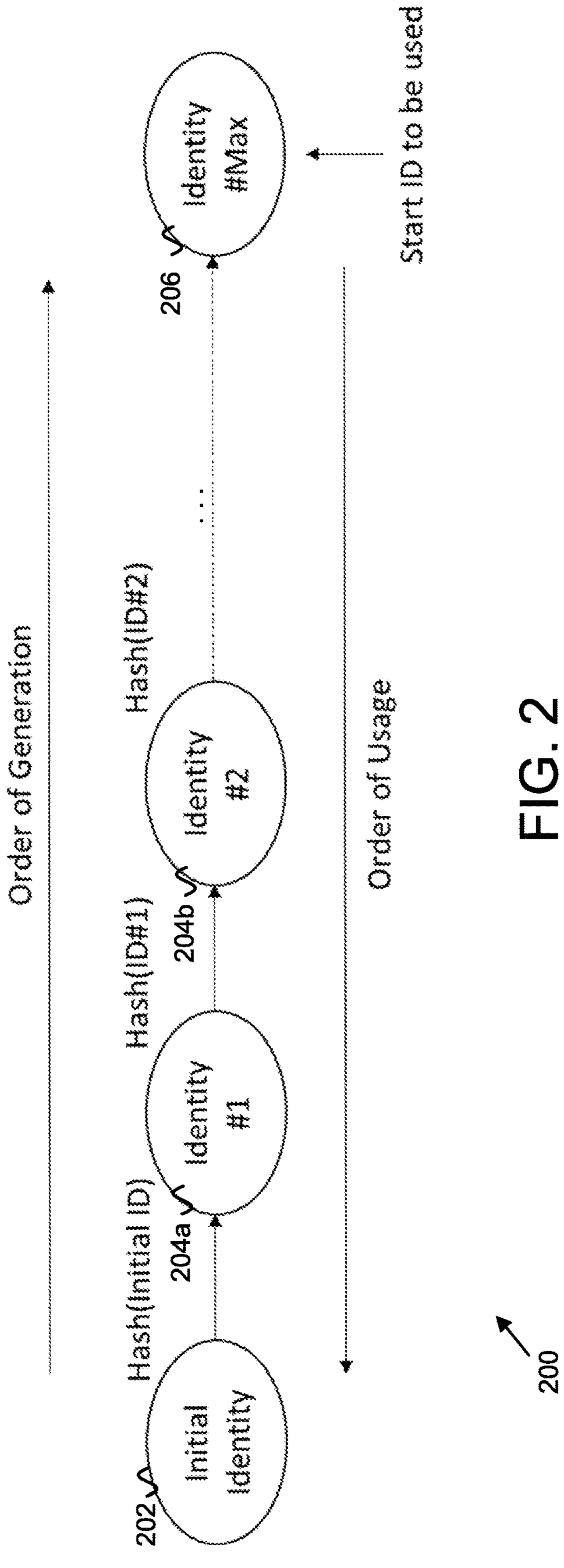
FIG. 2 is a diagram illustrating one embodiment of a hash chain generation and usage for dynamic user equipment identifier assignment.

In one embodiment, the UAV 106 and the USS/UTM 157 generate (see block 315 and 320), using the same hash function(s), the hash-chain as described in FIG. 2, and stores the generated identifiers in the same order in which the identifiers were generated, e.g., using an array, a linked list, and/or some other data structure In some embodiments, the UAV 106 and the USS/UTM 157 update (see blocks 325 and 330) the identifier that is currently assigned to the UAV 106 according to the update interval by starting with the last identifier in the hash-chain and then moving with each update interval towards the initial UAV identifier (that the USS/UTM 157 generates and sends to the UAV 106). Once the UAV 106 and the USS/UTM 157 reach the initial UAV identifier or are close to the initial UAV identifier (e.g., one, two, five identifiers away, or the like), the USS/UTM 157 may restart the procedure depicted in FIG. 3 at Step 1. In certain embodiments, the update interval and/or the maximum hash-chain length may also be changed, which may be defined according to a configuration of the USS/UTM 157. In one embodiment, restarting the procedure depicted in FIG. 3 may be triggered by either the UAV 106 or the USS/UTM 157.

Figure 4:
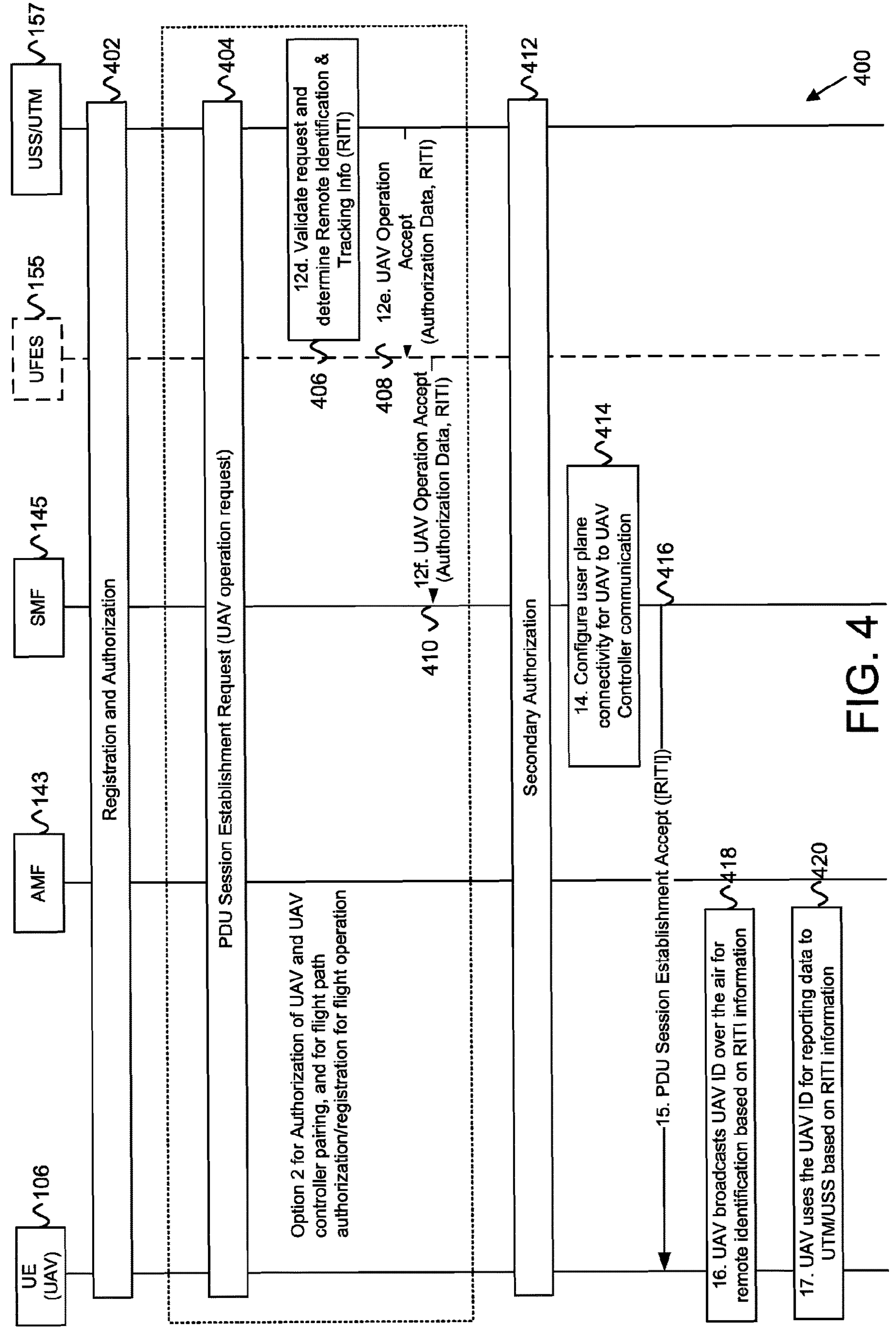
FIG. 4 is a signal flow diagram illustrating one embodiment of a procedure for UAV authentication and authorization with USS/UTM.

A further embodiment is directed to NAS-based identifier provisioning. In one embodiment, this embodiment is based on 3GPP TR 23.754, a portion of which is illustrated in FIG. 4. In one embodiment, the UAV 106 goes through a registration and authorization procedure (see block 402) and requests to establish a PDU session (see block 404).

In certain embodiments, the following steps of the procedure of clause 6.5.3.1 of TR 23.754 are modified as disclosed herein:

At step 12*d*, the USS/UTM 157 validates (see block 406) the PDU establishment request based on a CAA-Level UAV identifier, a permanent equipment identifier ("PEI"), and a flight authorization identifier, if one is provided.

In one embodiment, the USS/UTM 157 determines remote identification and tracking information ("RITI") for the UAV 106 to use. This may include a new initial CAA-level UAV identifier (e.g., a temporary identifier for remote identification) that is used as a means to remotely identify the UAV 106, an update interval, a hash chain length, and authorization data that may include the authorized area and time where the UAV 106 can operate, the UAV 106 type, and/or the like.

The USS/UTM 157, in one embodiment, generates a hash chain up to the hash chain length (see FIG. 2), starting with the initial CAA-level UAV identifier and updates the identifier in use according to the update interval by starting with the last identifier in the hash chain and then moving with each update interval towards the initial UAV identifier so that the USS/UTM 157 knows at any time which UAV identifier is currently assigned to the UAV 106 at the moment.

In one embodiment, the time when the USS/UTM 157 needs to provide a new initial CAA-level UAV identifier (e.g., the time to trigger a reset or restart of the hash chain) is determined by multiplying the hash chain length with the update interval. The update interval and the hash chain length may be independent parameters of the RITI. The USS/UTM 157 may also determine authorization data containing information about the user plane connectivity between the UAV 106 and the UAV controller 108. Some of the RITI information, e.g., the CAA-level UAV identifier, are received and stored by the UFES 155, together with the authorization data.

As step 12*e*, the USS/UTM 157 sends (see messaging 408) a UAV operation accept to the UFES 155 containing the authorization data and RITI, which may also include the update interval and hash chain length. The authorization data may include the authorized UAV 106 and UAV controller 108 pairing information, e.g., including the identifier of the UAV controller 108 that controls the UAV 106 or the identifier of the UAV 106 that the UAV controller 108 controls.

At step 12*f*, the UFES 155 sends (see messaging 410) a UAV operation accept to the USS/UTM 157 containing the authorization data and RITI, which also may include the update interval and hash chain length. The UFES 155 may store the correspondence between the CAA-Level UAV identifier, the 3GPP UAV identifier, the authorization data, and the RITI. The UFES 155 may generate the hash chain up to the hash chain length (see FIG. 2) and may update the UAV identifier in use according to the update interval by starting with the last identifier in the hash-chain and then moving with each update interval towards the Initial UAV identifier, so that the UFES 155 knows at any time which UAV identifier is currently assigned to the UAV 106 at any moment.

A secondary authorization may be performed (see block 412) during the PDU session establishment, which may provide GPSI to the USS/UTM 157 for authorization of UAV 106 and UAV controller 108 pairing, and for flight path authorization/registration for flight operation. In one embodiment, as part of the secondary authorization, the USS/UTM 157 may assign RITI information. At step 14, the SMF 145 configures (see block 414) the user plane connectivity for communications between the UAV 106 and the UAV controller 108.

At step 15, the PDU session establishment succeeds upon indication from the USS/UTM 157 that the UAV operation request is accepted and/or that the secondary authorization succeeded. The SMF 145 forwards (see messaging 416) the RITI, which may include the update interval and hash chain length to the UAV 106 within the protocol configuration options ("PCO") of the session management message. The UAV 106 may generate the hash chain up to the hash chain length (see FIG. 2) and may update the UAV identifier in use, e.g., the identifier that is assigned to the UAV 106, according to the update interval by starting with the last identifier in the hash chain and then moving with each update interval towards the initial UAV identifier.

At step 16, the UAV 106 broadcasts (see block 418) remote identification information for remote identification based on the RITI information and the current UAV identifier that is assigned to the UAV 106. At step 17, the UAV 106 sends (see messaging 420) remote identification information to the USS/UTM 157 based on the RITI information and the currently assigned UAV identifier.

In certain embodiments, the USS/UTM 157 and/or the UFES 155 does not generate a hash chain and just updates the UAV 106 with a new initial UAV identifier, update interval, and maximum hash chain length, when the USS/UTM 157 assumes that the UAV 106 has reached the beginning of the hash chain, e.g., a timer in the USS/UTM 157 reaches the value of the update interval multiplied with the hash chain length.

In some embodiments, the USS/UTM 157 and/or the UFES 155 generates a list of (pseudo) random identities and sends the list of the identities to the UAV 106 together with the update interval.

In further embodiments, the USS/UTM 157 and/or the UFES 155 generates at least one of the following information elements—an initial UAV identifier, an update interval, and/or a maximum hash chain length in response to a request from the UAV 106.

In certain embodiments, the initial UAV identifier, the update interval, and the maximum hash-chain length are preconfigured in the UAV 106 and the USS/UTM 157 and/or the UFES 155.

In some embodiments, the USS/UTM 157 and/or the UFES 155 and the UAV 106 do not update, recreate, regenerate, or the like the hash chain when the initial UAV identifier is reached, but instead restart again with the last entry in the hash chain.

In various embodiments, the USS/UTM 157 and/or the UFES 155 and the UAV 106 do not follow a static update interval but follow a pattern that infrequently updates the UAV identifier to the next identifier in the hash chain. The infrequent pattern may be configured or provisioned on the UAV 106.

In further embodiments, the USS/UTM 157 and/or the UFES 155 sends at least one of the following information elements—the initial UAV identifier, the update interval, and/or the maximum hash chain length to the UAV controller 108 in a similar manner as to the UAV 106.

Figure 5:
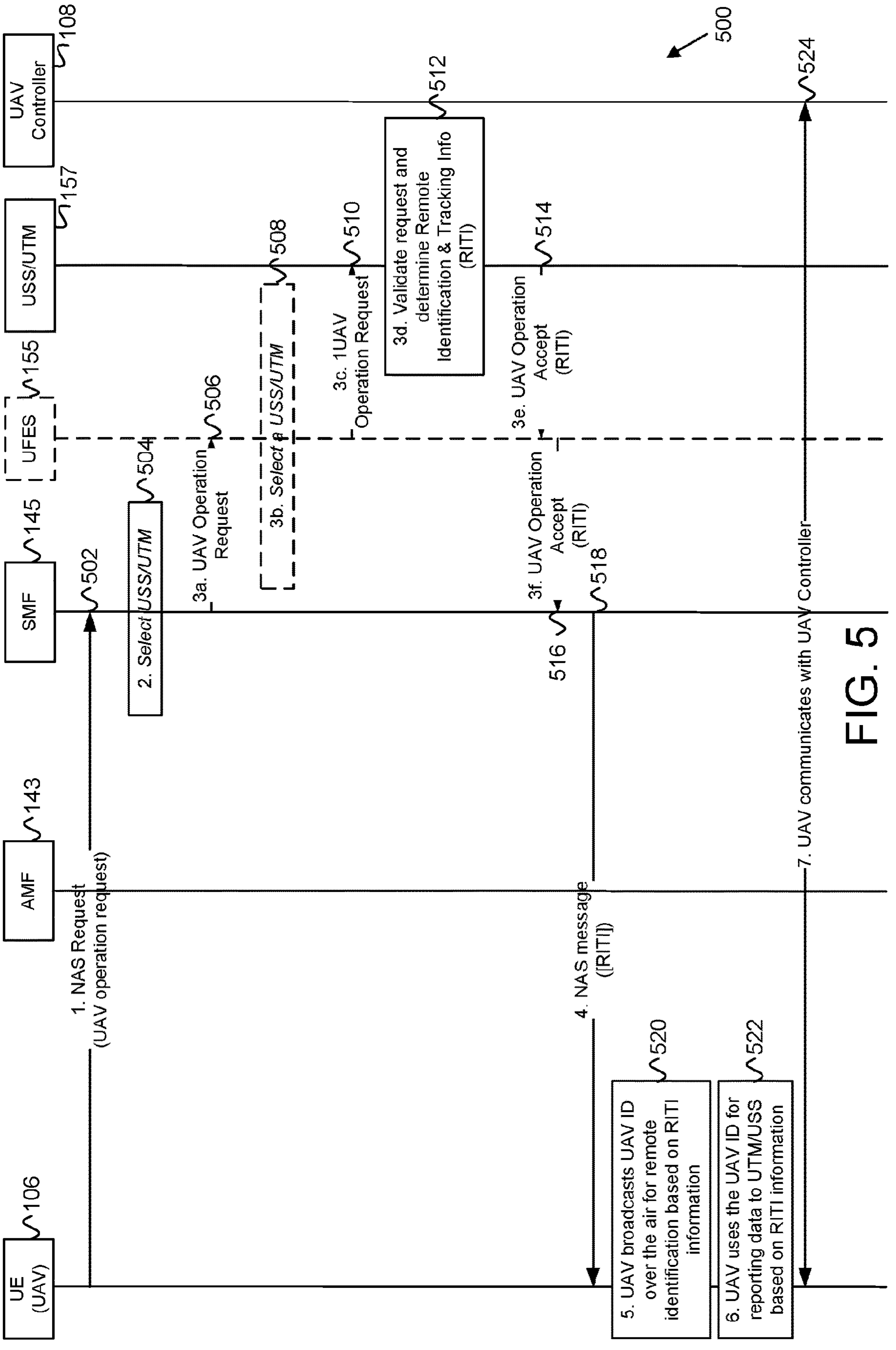
FIG. 5 is a signal flow diagram illustrating one embodiment of a procedure for NAS-based initial identifier refresh.

FIG. 5 depicts an embodiment for NAS-based initial identifier refresh, which may be based on the procedure depicted in FIG. 4 and may assume that an initial identifier (e.g., CAA-level UAV ID) has been provisioned inside or together with the RITI already. The procedure may be triggered by the USS/UTM 157, e.g., starting with step 3*d*, but it is shown triggered by the UAV 106 in the following:

At step 1, in one embodiment, when the UAV 106 recognizes it is close to the beginning of the hash chain, e.g., that the hash chain is reaching the initial identifier (e.g., CAA-level UAV identifier) or has already reached the initial identifier, then it sends (see messaging 502) a NAS request with the UAV operation request to the SMF 145. The UAV operation request may indicate that the UAV 106 needs to be provisioned at least with a new initial identifier. The UAV 106 may also be provisioned with a new update interval and hash chain length. Whether the update interval and hash chain length are changed, adjusted, modified, or the like, may be determined based on the configuration of the USS/UTM 157.

At step 2, in one embodiment, the SMF 145 selects (see block 504) the USS/UTM 157 based on a previous registration. At step 3*a*, in one embodiment, the SMF 145 sends (see messaging 506) the UAV operation request to the UFES 155. At step 3*b*, in one embodiment, the UFES 155 recognizes that the UAV operation request is to update the initial identifier and selects (see block 508) the USS/UTM 157 according to the previous registration.

At step 3*c*, in one embodiment, the UFES 155 sends (see messaging 510) the UAV operation request to the selected USS/UTM 157. At step 3*d*, in one embodiment, the USS/UTM 157 validates (see block 512) the request based on the currently used CAA-Level UAV identifier and the PEI.

Based on the PEI, in certain embodiments, the USS/UTM 157 selects the current hash chain and validates the received CAA-Level UAV identifier that is currently assigned to the UAV 106. The USS/UTM 157, in various embodiments, determines RITI for the UAV 106, which may include a new initial CAA-level UAV identifier (e.g., a temporary identifier for remote identification) that is used as a means to remotely identify the UAV 106 and may include a new update interval and hash chain length.

The USS/UTM 157 may generate a hash chain up to the hash chain length (see FIG. 2), starting with the initial CAA-level UAV identifier and updates the UAV identifier in use according to the update interval by starting with the last identifier in the hash-chain and then moving with each update interval towards the initial UAV identifier so that the USS/UTM 157 knows at any time which UAV identifier the UAV 106 is using or assigned at the moment. The hash chain length multiplied with the update interval may indicate the time when the USS needs to provide a new initial CAA-level UAV identifier. The update interval and hash chain length may be independent parameters of the RITI. Some of the RITI information, e.g., the CAA-level UAV identifier, may be received and stored by the UFES 155, together with the authorization data.

At step 3*e*, in one embodiment, the USS/UTM 157 sends (see messaging 514) a UAV operation accept message to the UFES 155 containing the authorization data and the RITI, which may include the update interval and hash chain length. At step 3*f*, in one embodiment, the UFES 155 sends (see messaging 516) a UAV operation accept to the USS/UTM 157 containing the authorization data and the RITI, which may include the update interval and hash chain length.

In one embodiment, the UFES 155 may store the correspondence between the CAA-Level UAV identifier, the 3GPP UAV identifier, the authorization data, and the RITI. The UFES 155 may generate the hash chain up to the hash chain length (see FIG. 2) and may update the UAV identifier that is in use or assigned according to the update interval by starting with the last identifier in the hash chain and moving with each update interval towards the initial UAV identifier, so that the UFES 155 knows which UAV identifier the UAV 106 is using or assigned.

At step 4, in one embodiment, the SMF 145 forwards (see messaging 518) the RITI, which may include the update interval and hash chain length, to the UAV 106 within the PCO of the session management message. The UAV 106 may generate the hash chain up to the hash chain length (see FIG. 2) and may update the UAV identifier that is in use or assigned to the UAV 106 according to the update interval by starting with the last identifier in the hash-chain and then moving with each update interval towards the initial UAV identifier.

At step 5, in one embodiment, the UAV 106 broadcasts (see block 520) remote identification information for remote identification based on the RITI information and current UAV identifier. At step 6, in one embodiment, the UAV 106 sends (see block 522) remote identification information to the USS/UTM 157 based on RITI information and current UAV identifier. At step 7, the UAV 106 communicates (see messaging 524) with the UAV controller 108.

Figure 6:
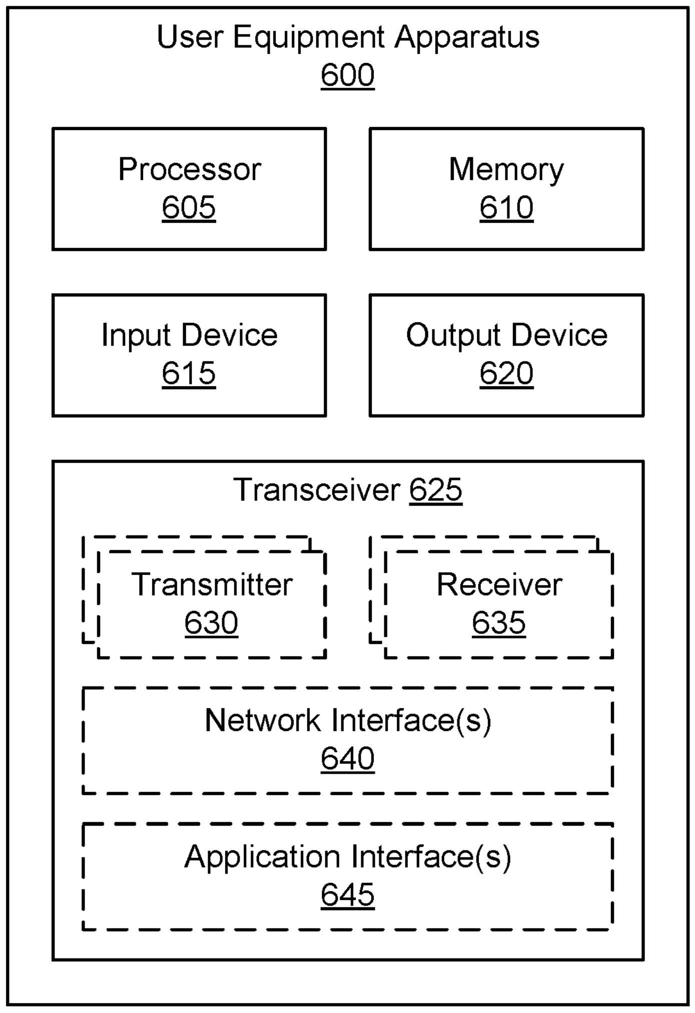
FIG. 6 is a block diagram illustrating one embodiment of a user equipment apparatus that may be used for dynamic user equipment identifier assignment.

FIG. 6 depicts a user equipment apparatus 600 that may be used for dynamic user equipment identifier assignment, according to embodiments of the disclosure. In various embodiments, the user equipment apparatus 600 is used to implement one or more of the solutions described above. The user equipment apparatus 600 may be one embodiment of the remote unit 105, the UAV 106, and/or the UAV controller 108, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panel supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PCS, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 605 may include an application processor (also known as "main processor") which manages application-domain and operating system ("OS") functions and a baseband processor (also known as "baseband radio processor") which manages radio functions.

In various embodiments, the transceiver 625 and processor 605 control the user equipment apparatus 600 to implement the above described UE behaviors. In one embodiment, the transceiver 625 receives, at a UE device, an initial identifier for the UE device from a mobile wireless communication network. In one embodiment, the processor 605 generates a plurality of identifiers for the UE device based on the initial identifier where each of the plurality of identifiers is generated based on a previous identifier to form a chain of identifiers.

In one embodiment, the processor 605 assigns an identifier that was generated last in the chain of identifiers to the UE device. In one embodiment, the processor 605 periodically assigns a different identifier to the UE device from the chain of identifiers, the different identifier comprises an identifier in the chain of identifiers that is used to generate the identifier that is currently assigned to the UE.

In one embodiment, the transceiver 625 receives, from the mobile wireless communication network, at least one of a maximum number of identifiers that are generated for the chain of identifiers and an update interval for periodically assigning the different identifier from the chain of identifiers to the UE device.

In one embodiment, the processor 605 regenerates the plurality of identifiers in the chain of identifiers in response to the assigned identifier being within a threshold number of identifiers of the initial identifier in the chain of identifiers. In one embodiment, the transceiver 625 sends a non-access stratum ("NAS") message to the mobile wireless communication network to request regeneration of the chain of identifiers in response to the assigned identifier being within a threshold number of identifiers of the initial identifier in the chain of identifiers and prior to regenerating the plurality of identifiers in the chain of identifiers.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to dynamic user equipment identifier assignment. For example, the memory 610 may store various parameters, panel/beam configurations, resource assignments, policies, identifiers, and the like, as described above. In certain embodiments, the memory 610 also stores program code and related data, such as an operating system or other controller algorithms operating on the user equipment apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
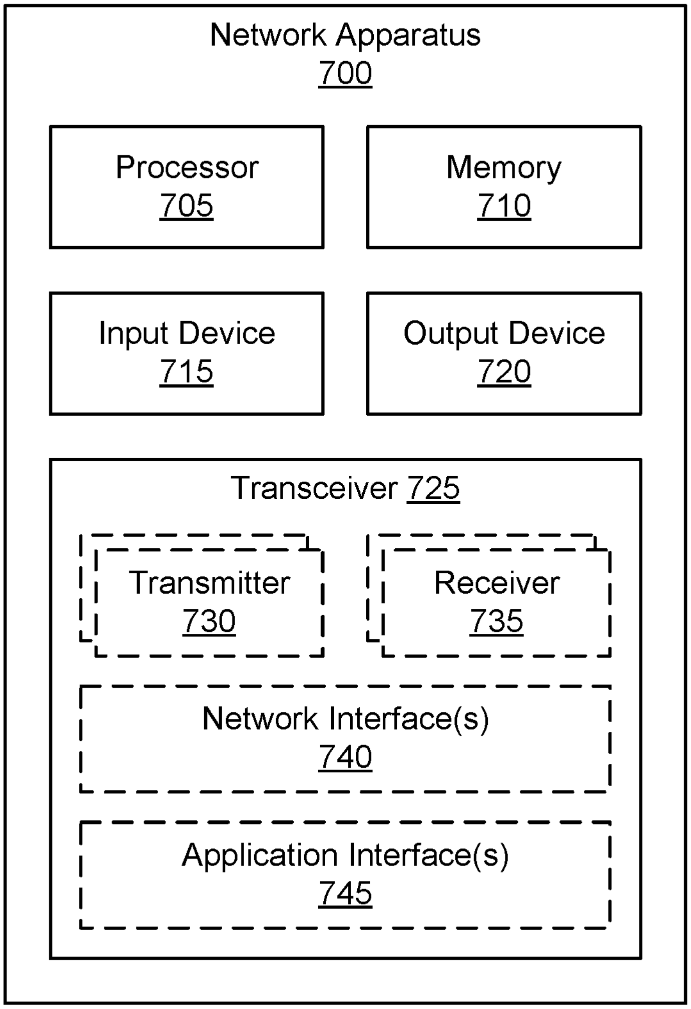
FIG. 7 is a block diagram illustrating one embodiment of a network apparatus that may be used for dynamic user equipment identifier assignment.

FIG. 7 depicts a network apparatus 700 that may be used for dynamic user equipment identifier assignment, according to embodiments of the disclosure. In one embodiment, network apparatus 700 may be one implementation of a RAN node, such as the base unit 121, the RAN node 210, or gNB, described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and II) routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio function.

In various embodiments, the network apparatus 700 is a USS/UTM 157 and/or a UFES 155, described above. In such embodiments, the transceiver 725 sends, to a user equipment ("UE") device from a mobile wireless communication network, e.g., the USS/UTM 157, an initial identifier for the UE device. In one embodiment, the processor 705 generates a plurality of identifiers for the UE device based on the initial identifier where each of the plurality of identifiers is generated based on a previous identifier to form a chain of identifiers.

In one embodiment, the processor 705 associates an identifier that was generated last in the chain of identifiers with the UE device. In one embodiment, the processor 705 periodically associates a different identifier with the UE device from the chain of identifiers, the different identifier comprising an identifier in the chain of identifiers that is used to generate the identifier that is currently associated with the UE.

In one embodiment, the transceiver 725 sends, to the UE device, at least one of a maximum number of identifiers that are generated for the chain of identifiers and an update interval for periodically associating the different identifier from the chain of identifiers with the UE device.

In one embodiment, the processor 705 regenerates the plurality of identifiers in the chain of identifiers in response to the associated identifier being within a threshold number of identifiers of the initial identifier in the chain of identifiers. In one embodiment, the transceiver 725 receives a non-access stratum ("NAS") message from the UE device to request regeneration of the chain of identifiers in response to the associated identifier being within a threshold number of identifiers of the initial identifier in the chain of identifiers.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to dynamic user equipment identifier assignment. For example, the memory 710 may store parameters, configurations, resource assignments, policies, identifiers, and the like, as described above. In certain embodiments, the memory 710 also stores program code and related data, such as an operating system or other controller algorithms operating on the network apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the NPN, PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
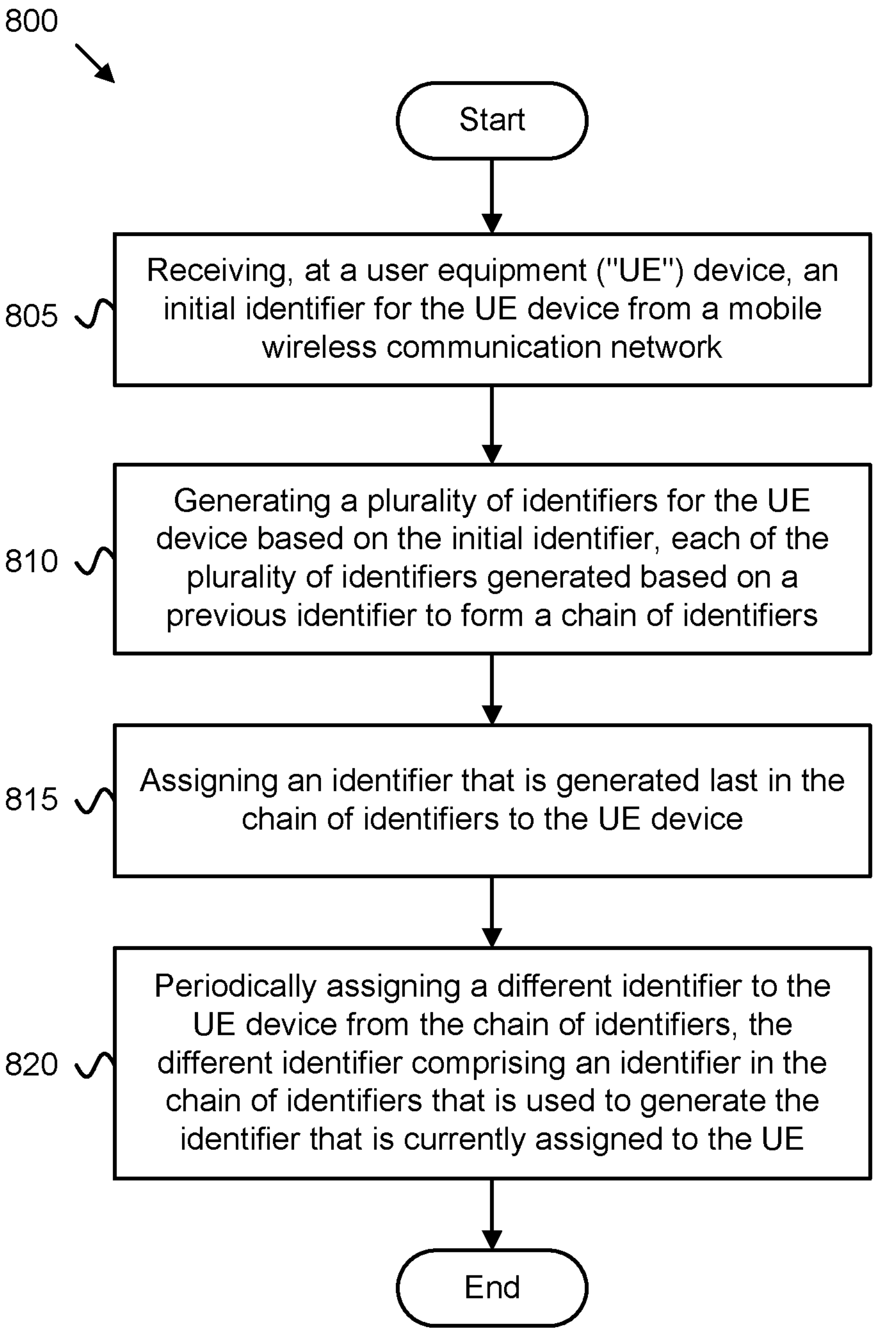
FIG. 8 is a flowchart diagram illustrating one embodiment of a method for dynamic user equipment identifier assignment.

FIG. 8 is a flowchart diagram of a method 800 for dynamic user equipment identifier assignment. The method 800 may be performed by a UE as described herein, for example, the remote unit 105, the UAV 106, the UAV controller 108, and/or the user equipment apparatus 600. In some embodiments, the method 800 may be performed by a processor executing program code, for example, a microcontroller, a microprocessor, a CPU, a GPU, an auxiliary processing unit, a FPGA, or the like.

The method 800, in one embodiment, includes receiving 805, at a user equipment ("UE") device, an initial identifier for the UE device from a mobile wireless communication network. The method 800, in one embodiment, includes generating 810 a plurality of identifiers for the UE device based on the initial identifier where each of the plurality of identifiers is generated based on a previous identifier to form a chain of identifiers.

The method 800, in one embodiment, includes assigning 815 an identifier that is generated last in the chain of identifiers to the UE device. The method 800, in one embodiment, includes periodically assigning 820 a different identifier to the UE device from the chain of identifiers where the different identifier comprises an identifier in the chain of identifiers that is used to generate the identifier that is currently assigned to the UE. The method 800 ends.

Figure 9:
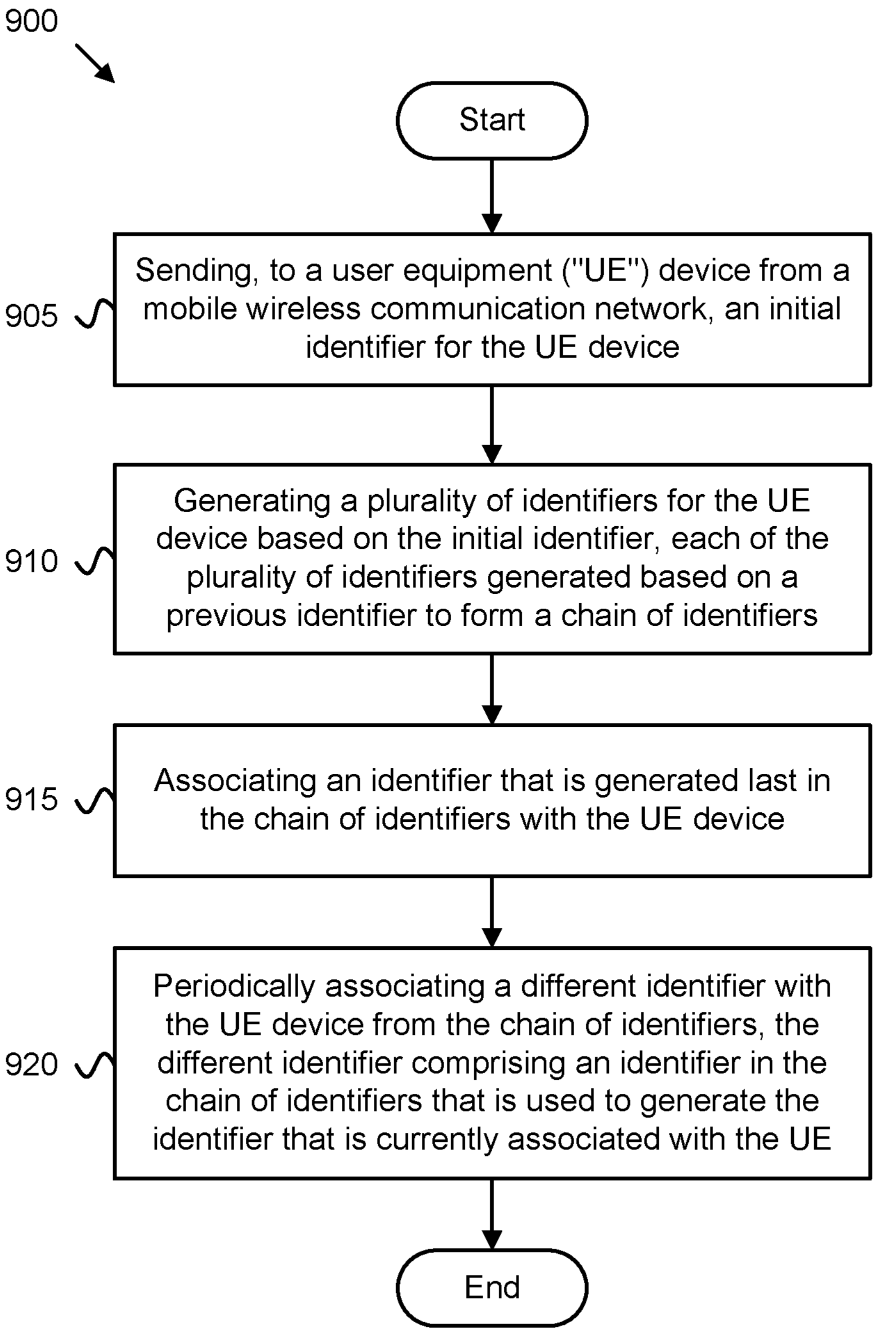
FIG. 9 is a flowchart diagram illustrating one embodiment of another method for dynamic user equipment identifier assignment.

FIG. 9 is a flowchart diagram of a method 900 for dynamic user equipment identifier assignment. The method 900 may be performed by a network function such as the USS/UTM 157, the UFES 155, and/or the like, and/or a network equipment apparatus 900. In some embodiments, the method 900 may be performed by a processor executing program code, for example, a microcontroller, a microprocessor, a CPU, a GPU, an auxiliary processing unit, a FPGA, or the like.

The method 900, in one embodiment, includes sending 905, to a user equipment ("UE") device from a mobile wireless communication network, an initial identifier for the UE device. The method 900, in one embodiment, includes generating 910 a plurality of identifiers for the UE device based on the initial identifier where each of the plurality of identifiers generated based on a previous identifier to form a chain of identifiers.

The method 900, in one embodiment, includes associating 915 an identifier that is generated last in the chain of identifiers with the UE device. The method 900, in one embodiment, includes periodically associating 920 a different identifier with the UE device from the chain of identifiers where the different identifier comprises an identifier in the chain of identifiers that is used to generate the identifier that is currently associated with the UE. The method 900 ends.

A first apparatus is disclosed for dynamic user equipment identifier assignment. The first apparatus may include a UE as described herein, for example, the remote unit 105, the UAV 106, the UAV controller 108, and/or the user equipment apparatus 600. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver that receives, at a user equipment ("UE") device, an initial identifier for the UE device from a mobile wireless communication network. In one embodiment, the first apparatus includes a processor that generates a plurality of identifiers for the UE device based on the initial identifier where each of the plurality of identifiers is generated based on a previous identifier to form a chain of identifiers.

In one embodiment, the processor assigns an identifier that was generated last in the chain of identifiers to the UE device. In one embodiment, the processor periodically assigns a different identifier to the UE device from the chain of identifiers, the different identifier comprises an identifier in the chain of identifiers that is used to generate the identifier that is currently assigned to the UE.

In one embodiment, the transceiver receives, from the mobile wireless communication network, at least one of a maximum number of identifiers that are generated for the chain of identifiers and an update interval for periodically assigning the different identifier from the chain of identifiers to the UE device.

In one embodiment, the processor regenerates the plurality of identifiers in the chain of identifiers in response to the assigned identifier being within a threshold number of identifiers of the initial identifier in the chain of identifiers. In one embodiment, the transceiver sends a non-access stratum ("NAS") message to the mobile wireless communication network to request regeneration of the chain of identifiers in response to the assigned identifier being within a threshold number of identifiers of the initial identifier in the chain of identifiers and prior to regenerating the plurality of identifiers in the chain of identifiers.

In one embodiment, the initial identifier for the UE is received in a non-access stratum ("NAS") message from the mobile wireless communication network. In one embodiment, the UE device comprises an unmanned aerial vehicle ("UAV") and the identifier comprises at least one of a temporary UAV identifier, a civil aviation authority ("CAA")-level UAV identifier, a remote identifier, a broadcast remote identifier, and an external identifier. In one embodiment, each of the plurality of identifiers is generated using at least one hash function, the at least one hash function being same between the UE device and the mobile wireless communication network.

A first method is disclosed for dynamic user equipment identifier assignment The first method may be performed by a UE as described herein, for example, the remote unit 105, the UAV 106, the UAV controller 108, and/or the user equipment apparatus 600. In some embodiments, the first method may be performed by a processor executing program code, for example, a microcontroller, a microprocessor, a CPU, a GPU, an auxiliary processing unit, a FPGA, or the like.

In one embodiment, the first method includes receiving, at a user equipment ("UE") device, an initial identifier for the UE device from a mobile wireless communication network. In one embodiment, the first method includes generating a plurality of identifiers for the UE device based on the initial identifier where each of the plurality of identifiers is generated based on a previous identifier to form a chain of identifiers.

In one embodiment, the first method includes assigning an identifier that is generated last in the chain of identifiers to the UE device. In one embodiment, the first method includes periodically assigning a different identifier to the UE device from the chain of identifiers where the different identifier comprises an identifier in the chain of identifiers that is used to generate the identifier that is currently assigned to the UE.

In one embodiment, the first method includes receiving, from the mobile wireless communication network, a maximum number of identifiers that are generated for the chain of identifiers. In one embodiment, the first method includes receiving, from the mobile wireless communication network, an update interval for periodically assigning the different identifier from the chain of identifiers to the UE device.

In one embodiment, the first method includes regenerating the plurality of identifiers in the chain of identifiers in response to the assigned identifier being within a threshold number of identifiers of the initial identifier in the chain of identifiers. In one embodiment, the first method includes sending a non-access stratum ("NAS") message to the mobile wireless communication network to request regeneration of the chain of identifiers in response to the assigned identifier being within a threshold number of identifiers of the initial identifier in the chain of identifiers and prior to regenerating the plurality of identifiers in the chain of identifiers.

In one embodiment, the initial identifier for the UE is received in a non-access stratum ("NAS") message from the mobile wireless communication network. In one embodiment, the UE device comprises an unmanned aerial vehicle ("UAV") and the identifier comprises at least one of a temporary UAV identifier, a civil aviation authority ("CAA")-level UAV identifier, a remote identifier, a broadcast remote identifier, and an external identifier. In one embodiment, each of the plurality of identifiers is generated using at least one hash function, the at least one hash function being same between the UE device and the mobile wireless communication network.

A second apparatus is disclosed for dynamic user equipment identifier assignment. The second apparatus may include a network function such as the USS/UTM 157, the UFES 155, and/or the like, and/or a network equipment apparatus 900. In some embodiments, the method 900 may be performed by a processor executing program code, for example, a microcontroller, a microprocessor, a CPU, a GPU, an auxiliary processing unit, a FPGA, or the like.

In one embodiment, the second apparatus includes a transceiver that sends, to a user equipment ("UE") device from a mobile wireless communication network, an initial identifier for the UE device. In one embodiment, the second apparatus includes a processor that generates a plurality of identifiers for the UE device based on the initial identifier where each of the plurality of identifiers is generated based on a previous identifier to form a chain of identifiers.

In one embodiment, the processor associates an identifier that was generated last in the chain of identifiers with the UE device. In one embodiment, the processor periodically associates a different identifier with the UE device from the chain of identifiers, the different identifier comprising an identifier in the chain of identifiers that is used to generate the identifier that is currently associated with the UE.

In one embodiment, the transceiver sends, to the UE device, at least one of a maximum number of identifiers that are generated for the chain of identifiers and an update interval for periodically associating the different identifier from the chain of identifiers with the UE device.

In one embodiment, the processor regenerates the plurality of identifiers in the chain of identifiers in response to the associated identifier being within a threshold number of identifiers of the initial identifier in the chain of identifiers. In one embodiment, the transceiver receives a non-access stratum ("NAS") message from the UE device to request regeneration of the chain of identifiers in response to the associated identifier being within a threshold number of identifiers of the initial identifier in the chain of identifiers.

In one embodiment, the initial identifier for the UE is sent in a non-access stratum ("NAS") message from the mobile wireless communication network. In one embodiment, the UE device comprises an unmanned aerial vehicle ("UAV") and the identifier comprises at least one of a temporary UAV identifier, a civil aviation authority ("CAA")-level UAV identifier, a remote identifier, a broadcast remote identifier, and an external identifier. In one embodiment, each of the plurality of identifiers is generated using at least one hash function, the at least one hash function being same between the UE device and the mobile wireless communication network.

A second method is disclosed for dynamic user equipment identifier assignment. The second method may be performed by a network function such as the USS/UTM 157, the UFES 155, and/or the like, and/or a network equipment apparatus 900. In some embodiments, the second method may be performed by a processor executing program code, for example, a microcontroller, a microprocessor, a CPU, a GPU, an auxiliary processing unit, a FPGA, or the like.

In one embodiment, the second method includes sending, to a user equipment ("UE") device from a mobile wireless communication network, an initial identifier for the UE device. In one embodiment, the second method includes generating a plurality of identifiers for the UE device based on the initial identifier where each of the plurality of identifiers is generated based on a previous identifier to form a chain of identifiers.

In one embodiment, the second method includes associating an identifier that is generated last in the chain of identifiers with the UE device. In one embodiment, the second method includes periodically associating a different identifier with the UE device from the chain of identifiers where the different identifier comprises an identifier in the chain of identifiers that is used to generate the identifier that is currently associated with the UE.

In one embodiment, the second method includes sending, to the UE device, a maximum number of identifiers that are generated for the chain of identifiers. In one embodiment, the second method includes sending, to the UE device, an update interval for periodically associating the different identifier from the chain of identifiers with the UE device.

In one embodiment, the second method includes regenerating the plurality of identifiers in the chain of identifiers in response to the associated identifier being within a threshold number of identifiers of the initial identifier in the chain of identifiers. In one embodiment, the second method includes receiving a non-access stratum ("NAS") message from the UE device to request regeneration of the chain of identifiers in response to the associated identifier being within a threshold number of identifiers of the initial identifier in the chain of identifiers.

In one embodiment, the initial identifier for the UE is sent in a non-access stratum ("NAS") message from the mobile wireless communication network. In one embodiment, the UE device comprises an unmanned aerial vehicle ("UAV") and the identifier comprises at least one of a temporary UAV identifier, a civil aviation authority ("CAA")-level UAV identifier, a remote identifier, a broadcast remote identifier, and an external identifier. In one embodiment, each of the plurality of identifiers is generated using at least one hash function, the at least one hash function being same between the UE device and the mobile wireless communication network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive, from a network, an initial identifier for the UE, wherein the initial identifier comprises a remote identifier for the UE during broadcast communication;
receive, from the network, an update interval that defines an interval for rotating identifiers;
generate a plurality of identifiers for the UE based on the initial identifier, each of the plurality of identifiers generated based on a previous identifier to form a chain of identifiers;
assign an identifier that was generated last in the chain of identifiers to the UE; and
periodically assign a different identifier to the UE from the chain of identifiers, according to the update interval, the different identifier comprising an identifier in the chain of identifiers used to generate the identifier currently assigned to the UE, wherein the periodic assignment maintains synchronization with the network such that identifiers assigned to the UE correspond to identifiers concurrently tracked by the network, and wherein the UE assigns the different identifier without receiving, at a time of assignment, a newly allocated identifier from the network.

2. The UE of claim 1, wherein the at least one processor is configured to cause the UE to receive at least one of a maximum number of identifiers that are generated for the chain of identifiers and the update interval for periodically assigning the different identifier from the chain of identifiers to the UE.

3. The UE of claim 1, wherein the at least one processor is configured to cause the UE to regenerate the plurality of identifiers in the chain of identifiers in response to the identifier currently assigned to the UE being within a threshold number of identifiers of the initial identifier in the chain of identifiers.

4. The UE of claim 3, wherein the at least one processor is configured to cause the UE to transmit a non-access stratum (NAS) message to request regeneration of the chain of identifiers in response to the identifier currently assigned to the UE being within a threshold number of identifiers of the initial identifier in the chain of identifiers and prior to regenerating the plurality of identifiers in the chain of identifiers.

5. The UE of claim 1, wherein the initial identifier for the UE is received in a non-access stratum (NAS) message.

6. The UE of claim 1, wherein the UE comprises an unmanned aerial vehicle (UAV) and the initial identifier comprises at least one of a temporary UAV identifier, a civil aviation authority (CAA)-level UAV identifier, a remote identifier, a broadcast remote identifier, and an external identifier.

7. The UE of claim 1, wherein each of the plurality of identifiers is generated using at least one hash function, the at least one hash function being same between the UE and the network.

8. A network equipment (NE), comprising:
at least one memory; and
at least one processor coupled with the at least one memory and configured to cause the NE to:

transmit an initial identifier for a user equipment (UE), wherein the initial identifier comprises a remote identifier for the UE during broadcast communication;

transmit an update interval that defines an interval for rotating identifiers;

generate a plurality of identifiers for the ULE based on the initial identifier, each of the plurality of identifiers generated based on a previous identifier to form a chain of identifiers;

associate an identifier that was generated last in the chain of identifiers with the UE; and periodically associate a different identifier with the UE from the chain of identifiers, according to the update interval, the different identifier comprising an identifier in the chain of identifiers used to generate the identifier currently associated with the UE, wherein the periodic association maintains synchronization with the UE such that identifiers associated with the UE correspond to identifiers concurrently tracked by the NE, and wherein the NE does not allocate and transmit a newly allocated identifier to the UE at a time of the periodic association.

9. The NE of claim 8, wherein the at least one processor is configured to cause the NE to send at least one of a maximum number of identifiers that are generated for the chain of identifiers and the update interval for periodically associating the different identifier from the chain of identifiers with the UE.

10. The NE of claim 8, wherein the at least one processor is configured to cause the NE to regenerate the plurality of identifiers in the chain of identifiers in response to the identifier currently associated with the UE being within a threshold number of identifiers of the initial identifier in the chain of identifiers.

11. The NE of claim 10, wherein the at least one processor is configured to cause the NE to receive a non-access stratum (NAS) message to request regeneration of the chain of identifiers in response to the identifier currently associated with the UE being within a threshold number of identifiers of the initial identifier in the chain of identifiers.

12. The NE of claim 8, wherein the initial identifier for the UE is sent in a non-access stratum (NAS) message.

13. The NE of claim 8, wherein the UE comprises an unmanned aerial vehicle (UAV) and the identifier comprises at least one of a temporary UAV identifier, a civil aviation authority (CAA)-level UAV identifier, a remote identifier, a broadcast remote identifier, and an external identifier.

14. The NE of claim 8, wherein each of the plurality of identifiers is generated using at least one hash function, the at least one hash function being the same between the UE and the NE.

15. A method performed by a user equipment (UE), comprising:

receiving an initial identifier for the UE, wherein the initial identifier comprises a remote identifier for the TE during broadcast communication;

receiving an update interval that defines an interval for rotating identifiers;

generating a plurality of identifiers for the UE based on the initial identifier, each of the plurality of identifiers generated based on a previous identifier to form a chain of identifiers;

assigning an identifier that was generated last in the chain of identifiers to the UE; and periodically assigning a different identifier to the UE from the chain of identifiers, according to the update interval, the different identifier comprising an identifier in the chain of identifiers that to generate the identifier currently assigned to the UE, wherein the periodic assignment maintains synchronization with a network such that identifiers assigned to the UE correspond to identifiers concurrently tracked by the network, and wherein the UE assigns the different identifier without receiving, at a time of assignment, a newly allocated identifier from the network.

16. The method of claim 15, further comprising receiving at least one of a maximum number of identifiers that are generated for the chain of identifiers and the update interval for periodically assigning the different identifier from the chain of identifiers to the UE.

17. The method of claim 15, further comprising regenerating the plurality of identifiers in the chain of identifiers in response to the identifier identifier currently assigned to the UE being within a threshold number of identifiers of the initial identifier in the chain of identifiers.

18. The method of claim 17, further comprising sending a non-access stratum (NAS) message to request regeneration of the chain of identifiers in response to the identifier currently assigned to the UE being within a threshold number of identifiers of the initial identifier in the chain of identifiers and prior to regenerating the plurality of identifiers in the chain of identifiers.

19. The method of claim 15, wherein the initial identifier for the UE is received in a non-access stratum (NAS) message.

20. A method performed by a network equipment (NE), comprising:

transmitting an initial identifier for a user equipment (UE), wherein the initial identifier comprises a remote identifier for the UE during broadcast communication;

transmitting an update interval that defines an interval for rotating identifiers;

generating a plurality of identifiers for the UE based on the initial identifier, each of the plurality of identifiers generated based on a previous identifier to form a chain of identifiers;

associating an identifier that was generated last in the chain of identifiers with the UE; and periodically associating a different identifier with the UE from the chain of identifiers, according to the update interval, the different identifier comprising an identifier in the chain of identifiers used to generate the identifier currently associated with the UE, wherein the periodic association maintains synchronization with the UE such that identifiers associated with the UE correspond to identifiers concurrently tracked by the NE, and wherein the NE does not allocate and transmit a newly allocated identifier to the UE at a time of the periodic association.

* * * * *